Aug. 3, 1943.　　　A. H. JUNG　　　2,326,037

FLUID PASSAGE SWIVEL JOINT

Original Filed Aug. 13, 1941

Inventor

ALBERT H JUNG

By KARL W. FLOCKS

Attorney

Patented Aug. 3, 1943

2,326,037

UNITED STATES PATENT OFFICE 2,326,037

FLUID PASSAGE SWIVEL JOINT

Albert H. Jung, Flushing, N. Y., assignor to United American Metals Corporation, Brooklyn, N. Y., a corporation of New York Application August 13, 1941, Serial No. 406,681

4 Claims. (Cl. 285—96.3)

This invention relates to double sided rotatable fluid cooled molds and more particularly to fluid passages therefore including swivel joints.

This application is a continuation-in-part of my copending application Serial Number 370,718 filed December 18, 1940, which in turn is a division of my application Serial Number 283,484 filed July 8, 1939, which has matured into Patent Number 2,234,528 on March 11, 1941.

Prior to the instant invention it has been customary to provide fluid cooled molds which were relatively difficult and expensive to manufacture and generally unsatisfactory with regard to operation because of inefficient fluid connections, bearings, and fluid distribution.

In prior constructions involving rotating dumping molds, little attention has been paid to apparatus for conducting thermal exchange fluid from a stationary conduit to the rotary molds. The use of flexible conduits has been contemplated but such constructions have not been found to be satisfactory as they are continually in the operator's way and make for inefficiency in operation. The utilization of swivel connections including shoulders and packing rings has also been contemplated and in such constructions it has been customary to provide a spring in order to maintain the packing under compression continually in an endeavor to eliminate leaking and inefficient operation of the swivel connection. Such constructions, however, have not been found to be entirely satisfactory, particularly under conditions found in the field such as when the connection is also utilized as a bearing and is subject to stresses and also when the fluid medium to be passed through the swivel connection is subjected to heat whereby the combined action of the stress, heat and continual rotation acting on the joint, make it essential that the inherent construction of the joint be of such character as to be capable of withstanding these forces and to continuously maintain the joint in substantially leakproof condition.

It is an object of the instant invention to provide a novel fluid cooled rotatable multi-sided dumping mold of such character as to simultaneously lend itself to ready fabrication and operation and provide for relatively efficient passage of thermal heat exchange fluid therethrough.

It is a further object of the instant invention to provide a novel double-sided dumping mold involving a combined swivel connection and bearing.

Other objects and the nature and advantages of the invention will be apparent from the following description taken in conjunction with the accompanying drawing, wherein.

Figure 1:
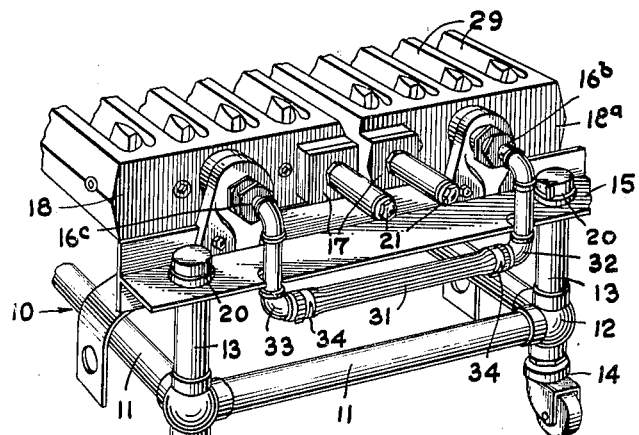
Fig. 1 is a fragmentary view in perspective of a double-sided twin set of rotating dumping molds incorporating fluid passage swivel joints in accordance with the invention.

Referring to the drawing, a framework 10 may generally comprise a series of pipes 11 joined by connectors 12 to form a substantially rectangular structure. From the connectors 12 there extend vertical pipes 13 and roller supports 14 whereby the entire mold apparatus may be readily moved about at the convenience of the operator. T section lengths of structural steel 15 extend across the upper portion of the apparatus and involve the dual function of supporting the swivel connector bearings 16b and 16c, see Fig. 1, and engaging the stops 17 mounted on the front end of the rotatable molds 18 and 18a respectively. The T-section length 15 is secured to the upstanding pipe members 13 by the threaded caps 20 which engage corresponding threaded upper portions of the pipes 13 extending through the T section lengths 15. Mounted substantially centrally of the stops 17 are the handles 21 whereby the operator may rotate the molds 18 and 18a as desired in accordance with casting activity.

The combined conduit swivel and bearing 16b may be connected to a conduit leading from a source, not shown, of cooling fluid such as cooling water or with the conduit 31 leading from mold 18 through swivel connector 16c.

Figure 2:
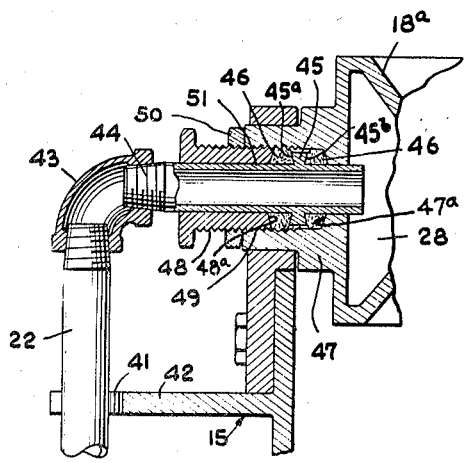
Fig. 2 is a fragmentary detail vertical sectional view of one form of combined swivel pipe connection and bearing incorporated in the dumping mold illustrated in Fig. 1.

To provide for the ingress and egress of heat exchange fluid to the rotating mold a swivel joint such as illustrated in Fig. 2 may be utilized. The stationary pipe 22 may pass through a notch 41 in the horizontal portion 42 of the T section length 15 and be associated with the angular connector 43 which in turn is threaded to stationary pipe section 44 which is provided with an annular collar 45 undercut on both sides 45a and 45b. The undercut sides of the collar 45 are adapted to engage the packing rings 46 as shown in Fig. 2. The gland 47 may be formed integral with the mold 18a and be capped by the packing screw plug 48 which is in threaded engagement with the interior of the wall 49 of the gland 47. The screw plug 48 is adapted to be undercut on its end face 48a as shown in Fig. 2. The undercutting of the face 48a slopes in a direction opposite to the slope of the undercutting of the side 45a of the collar 45. The inner rear wall 47a of the gland 47 is also tapered and the plane of this taper generally slopes in a direction opposite to the slope of the undercut side 45b of the collar 45. It is to be borne in mind that the mold 18a is adapted to be rotated about the stationary pipe section 44 and that the angular collar 45 formed integral therewith serves to prevent the leakage of fluid transferred between the interior of the pipe section 44 and the passage 28, the undercut collar 45 cooperating with the packing rings 46 to effect a forcing thereof against the generally cylindrical exterior 51 of the pipe-like element 44 and thereby serves to effect an efficient seal, as well as a bearing. After the screw plug 48 has been turned so that the packing 46 is under compression the packing 46 will be forced against the exterior 51 as already explained. This action takes place to effect an efficient seal without the necessity of the utilization of any springs or other parts because of the particular shape of the collar 45 which is undercut as shown in Fig. 2. Not only does the undercutting of the collar 45 serve to best hold the packing 46 against the exterior 51 of the pipe-like element 44 but because of the undercutting, the path of leakage around the collar 45 against which the packing 46 acts is increased without the utilization of any additional elements and, therefore, the particular shape of the collar 45 serves to increase the efficiency of the seal and thereby effects a new result. The combined action of the undercut collar and the particular shape of the end face of the screw plug 48 and the inner side of the rear wall of the gland 47 serves to more uniformly effect the holding of the packing against the exterior wall 51 of the pipe-like element 44 and this is essential particularly when the swivel joint is used as a bearing and is subject to stress and also after continued use of the device in which the packing may or may not be of a homogeneous nature. The specific construction of the undercut collar and associated parts as described serves to prolong the life of the packing because of the more uniform compression of same and utilization of the packing under pressure against the exterior 51 of the element 44. Under the conditions found in the field wherein the joint shown in the drawing has been subjected to stress when the combination is used in connection with the rotation of heavy metal molds, heat which is transmitted through the joint into the packing from the cooling of the metal within the mold and continued friction because of more or less continuous operation of the mold, the joint has been substantially leak proof for long periods of time.

Figure 3:
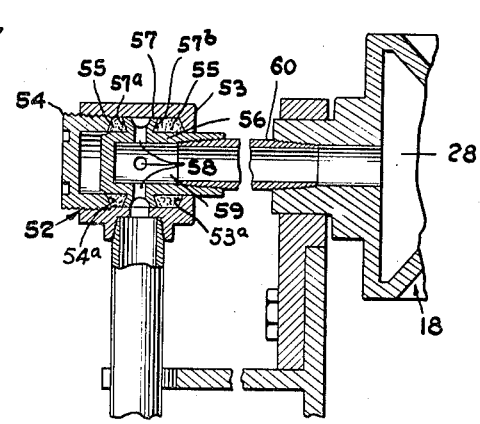
Fig. 3 is a view similar to Fig. 2 but of a modified form of combined swivel pipe connection and bearing.

A modified form of swivel connector bearing is illustrated in Fig. 3 wherein a gland 52 may be independent of the mold casting 18 and comprise a body portion 53 and packing nut 54, as well as packing rings 55 which cooperate with the rotatable element 56 which has formed thereon the annular collar 57 which is drilled at 58 to provide communication with its interior 59 from the interior of the stationary pipe 22. The rotatable connector element 60 communicates the interior of the mold 18, that is, the passage 28, with the interior 59 of the element 56 and is threaded to the mold 18 and the element 56. The annular collar 57 is undercut on its sides 57a and 57b. The packing nut 54 is undercut on its end 54a and the body portion 53 of the gland 52 is tapered at 53a whereby the same wedging action takes place as set forth in connection with the form of the device shown in Fig. 2. The undercut sides 57a and 57b cooperate with the tapered ends 54a and 53a to hold the packing 55 against the exterior wall of the element 56 which is adjacent the annular collar 57.

The combined swivel fluid connector and mold bearings illustrated in Figs. 2 and 3 are not only adapted to serve as passages for the thermal exchange fluid between the pipe exterior of the mold and the mold's interior, but they serve as supporting bearings for the rotating molds. Accordingly, the elements 16b and 16c are designed to be stress transmitting and to prevent leakage otherwise present because bearing stress tends to aggravate leakage tendencies due solely to fluid pressure in swivel joints. In accordance with the invention, leakage is prevented by the provision of an annular undercut collar and the association and cooperation of packing with the undercut sides of the collar and the tapered walls of the elements forming the ends of the packing gland, whereby the packing is held against the exterior wall of the pipe section within the packing rings in a novel manner. In the embodiment illustrated in Fig. 2, the collar is stationary. In the embodiment illustrated in Fig. 3, the collar 57 is rotatable and in addition it forms an inlet passage. This latter construction is adapted to be used in connection with molds which are not specially cast to receiving a swivel connection such as illustrated in Fig. 2.

As has been explained in detail above, the molds in accordance with the invention are generally superior to previous molds for they may be readily fabricated as by casting and permit the flow therethrough of heat transfer fluid without the use of movable flexible pipes.

In operation, the mold 18 after being filled may be rotated by grasping the handle 21 which may comprise a revoluble insulated part and imparting thereto an oscillatory motion, thereby effecting dumping of ingots solidified within one side of the mold. By this time, the mold 18a may be filled and ready for dumping and the handle of that mold is oscillated, effecting the emptying of one side of that mold. While the mold 18a is being dumped the second side of the mold 18 may be filled and when the filling operation of that mold is completed the second side of the mold 18a may be filled with molten metal to be cast into ingots. By the time the second side of the mold 18b is filled the mold 18a is again ready for dumping and the cycle described repeated.

The above method of operation is relatively efficient with regard to the utilization of the time of a single operator working on a double-sided twin mold such as illustrated in Fig. 1 and filling and casting may be substantially continuous.

In accordance with the invention, not only does the hot molten metal within the cavities transfer its latent heat of fusion through the side walls thereof to the heat exchange cooling fluid, but the side walls of the bottom empty cavities act as fins to also transmit heat from the side walls and bottoms of the filled cavities to the cooling fluid contacting the side walls of these empty cavities, whereby rapid cooling permitting rapid substantially continuous casting may be effected.

In accordance with the invention the combined fluid passage swivel connectors and bearings are so designed that the packing gland houses a tubular conduit having an integral annular undercut collar-like projection which cooperates with packing rings which in turn cooperate with the tapered end walls of the gland housing or elements which form the gland housing so that an efficient leakproof joint is provided that does not interfere with the passage of fluid therethrough, and by its nature is capable of carrying bearing stresses of a character found in a rotatable metal mold of the character described.

Figure 4:
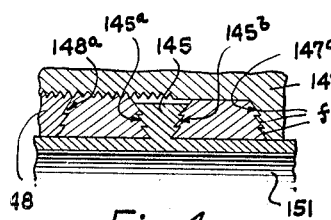
Figure 4 is a fragmentary view partly in section and partly in elevation disclosing a tapered faceted collar like projection.
Figure 5:
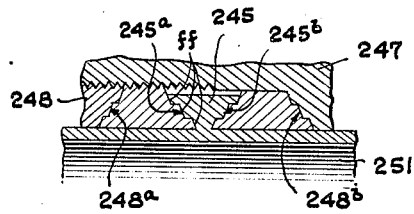
Figure 5 is a view similar to Figure 4 but a modified form of faceted arrangement.

Referring to Figures 4 and 5, wherein is shown two forms of the invention somewhat modified from the construction shown in Figure 2, the tubular elements 151 and 251 correspond to the element 51 shown in Figure 2. The undercut faces 145a and 145b of the collar-like projection 145 as well as the undercut face 148a of the packing nut 148 and the tapered face 147a of the element 147 are each made up of a plurality of relatively small facets $f$ separated from each other by a relatively small horizontal dimension extending inwardly from the outer end of each facet with respect to the axis of the tubular element 151 as shown in Figure 4. In Figure 5, the small facets $ff$ on the undercut faces 245a and 245b of the collar-like element 245 formed integral with the tubular element 251, as well as the undercut face 248a of the packing nut 248 and the tapered face 247a of the element 247, are each separated from each other by a relatively small horizontal dimension extending outwardly from the outer end of each face relative to the axis of the tubular element 251. The sawtoothed arrangement of the tapered end undercut faces serves to better hold the packing against the sealing surfaces including the packing nut, the exterior cylindrical surfaces of the tubular element and the collar-like projection whereby the desired seal for the rotating swivel joint is more effectively accomplished, particularly when the swivel joint is subjected to temperature conditions and bearing stresses which are relatively severe as when the swivel joint is used in connection with a rotatable water cooled metal mold for the casting of metal ingots as above set forth.

While the faceted constructions for the collar-like projection in the packing nut face and the inner face of the element with which it cooperates as shown in Figures 4 and 5, have been described as being modifications which could be incorporated in the combination shown in Fig. 2, it is to be understood that this faceted construction can also be incorporated in the form of the combination shown in Fig. 3.

It will be obvious to those skilled in the art that various changes may be made in this device without departing from the spirit of the invention and therefore the invention is not limited to what is shown in the drawing and described in the specification but only as indicated in the appended claims.

What is claimed is:

1. A combined fluid passage swivel connection and bearing for a rotatable fluid cooled heavy metal mold section comprising a straight horizontal tubular member secured to said section and being rotatable therewith, a stationary gland continually subjected to heat given off by solidifying molten metal, a rotatable element mounted within said gland provided with an integrally formed annular undercut collar-like projection, said rotatable element being hollow and having passages extending through said collar-like projection to its hollow interior, said hollow interior communicating with said tubular element and in turn with the interior of said rotatable mold section which is adapted to have heat exchange fluid pass therethrough, packing rings within said gland arranged on said rotatable element and in contact with the undercut side walls of the projection formed thereon, a packing nut engaging said packing and co-operating with said gland in screw threaded relation, the inner face of said packing nut which contacts said packing being undercut and tapered inwardly toward the axis of said nut, the inner end of said gland which is at the opposite end thereof in relation to said packing nut having a face which is tapered in a direction generally opposite to the inner face of said packing nut, said gland being provided with an opening in alignment with the passages through said rotatable element and an inlet pipe connected with the gland at the said opening whereby heat exchange fluid may be passed to the interior of said mold section through said combined bearing and swivel connector, the undercut faces of said collar-like projection cooperating with the undercut inner face of said packing nut and the tapered inner end wall of said gland to hold the said packing rings against the exterior wall of said rotatable element in a manner to effect a substantial leak proof joint.

2. A combined fluid passage swivel connection and bearing for a rotatable fluid cooled heavy metal mold section comprising a packing gland directly associated with said section and being continually subjected to heat given off by solidifying molten metal, a tubular element formed with a collar-like projection thereon having undercut side faces located within said packing gland, said tubular element being connected to said rotatable section and a stationary conduit, said tubular element and said packing gland being relatively rotatable with respect to each other, a packing nut in said packing gland, an inner end wall formed in said packing gland, the inner end wall of said packing nut being undercut and the inner wall of said packing gland being tapered in a direction generally opposite to the inner end wall of said packing nut, packing rings located about said tubular element and adjacent the undercut faces of said collar-like projection and the end wall of said packing nut and the inner end wall of said packing gland, said undercut faces and tapered end walls cooperating with said packing to hold same against said tubular element in order to effect a substantially leak proof joint, the undercut side faces of the collar-like projection, the undercut inner end wall of the packing nut, and the tapered face on the inner wall of said packing gland each comprising a plurality of relatively small tapered facets offset from each other by a relatively small horizontal dimension extending in a direction inwardly and from the outer end of each relatively small facet beginning at the outer end of each facet with respect to the axis of said tubular element.

3. A combined fluid passage swivel connection and bearing for a rotatable fluid cooled heavy metal mold section comprising a packing gland directly associated with said section and being continually subjected to heat given off by solidifying molten metal, a tubular element formed with a collar-like projection thereon having undercut side faces located within said packing gland, said tubular element being connected to said rotatable section and a stationary conduit, said tubular element and said packing gland being relatively rotatable with respect to each other, a packing nut in said packing gland, an inner end wall formed in said packing gland, the inner end wall of said packing nut being undercut and the inner wall of said packing gland being tapered in a direction generally opposite to the inner end wall of said packing nut, packing rings located about said tubular element and adjacent the undercut faces of said collar-like projection and the end wall of said packing nut and the inner end wall of said packing gland, said undercut faces and tapered end walls cooperating with said packing to hold same against said tubular element in order to effect a substantially leak proof joint, the undercut side faces of the collar-like projection, the undercut inner end wall of the packing nut, and the tapered face on the inner wall of said packing gland each comprising a plurality of relatively small tapered facets offset from each other by a relatively small horizontal dimension extending in a direction outwardly and from the outer end of each relatively small facet beginning at the outer end of each facet with respect to the axis of said tubular element.

4. A combined fluid passage swivel connection and bearing for a rotatable fluid cooled heavy metal mold section comprising a packing gland directly associated with said section and being continually subjected to heat given off by solidifying molten metal, a tubular element formed with a collar-like projection thereon having undercut side faces located within said packing gland, said tubular element being connected to said rotatable section and a stationary conduit, said tubular element and said packing gland being relatively rotatable with respect to each other, a packing nut in said packing gland, an inner end wall formed in said packing gland, the inner end wall of said packing nut being undercut and the inner wall of said packing gland being tapered in a direction generally opposite to the inner end wall of said packing nut, packing rings located about said tubular element and adjacent the undercut faces of said collar-like projection and the end wall of said packing nut and the inner end wall of said packing gland, said undercut faces and tapered end walls cooperating with said packing to hold same against said tubular element in order to effect a substantially leak proof joint, the undercut side faces of the collar-like projection, the undercut inner end wall of the packing nut, and the tapered face on the inner wall of said packing gland each comprising a plurality of relatively small tapered facets offset from each other by a relatively small horizontal dimension.

ALBERT H. JUNG.